though attempts are made to minimize formation of the 2-isomer by keeping the temperature as low as possible, contamination still occurs and the product must be purified, as for example, by fractional precipitation of metal and/or amine salts before the 1-isomer product can be obtained in a form acceptably free of the 2-isomer. Such additional purification is uneconomical, laborious and slow.

United States Patent Office 3,155,716
Patented Nov. 3, 1964

3,155,716
PREPARATION OF PURE ALPHA-NAPHTHALENE SULFONIC ACID AND ALPHA-NAPHTHOL
Albert P. Paul, New Brunswick, and Richard F. Beidler, Middlesex, N.J., assignors to American Cyanamid Company, New York, N.Y., a corporation of Maine
No Drawing. Filed Sept. 29, 1961, Ser. No. 141,601
4 Claims. (Cl. 260—505)

This invention relates to an improved process for the sulfonation of naphthalene. More particularly, it is concerned with reacting naphthalene and chlorosulfonic acid to obtain an improved 1-naphthalene sulfonic acid product containing less than 3% of the 2-naphthalenesulfonic acid isomer. Still more specifically it contemplates the use of a nitro-aromatic hydrocarbon solvent in certain critical proportions.

1-naphthalenesulfonic acid, an important intermediate in the manufacture of dyes and other chemicals, is manufactured commercially by the reaction of naphthalene with a suitable sulfonating agent. The latter includes concentrated sulfuric acid, 1–15% oleum chlorosulfonic acid, sodium trihydrogen disulfate and the like. The reaction is usually conducted at temperatures below 60° C. Despite its acceptance, unfortunately, this method yields a product which is quite contaminated with the 2-isomer, sometimes containing up to 20% or more of it. Although attempts are made to minimize formation of the 2-isomer by keeping the temperature as low as possible, contamination still occurs and the product must be purified, as for example, by fractional precipitation of metal and/or amine salts before the 1-isomer product can be obtained in a form acceptably free of the 2-isomer. Such additional purification is uneconomical, laborious and slow.

It is, therefore, the primary object of this invention to provide a sulfonation process by which naphthalene is converted to 1-naphthalene sulfonic acid without being subject to these limitations.

In view of the previous lack of success, these objects have been accomplished to a surprisingly successful degree. According to the present invention, the reaction of naphthalene with chlorosulfonic acid is carried out in a nitro aromatic hydrocarbon such as nitrobenzene, nitrotoluene, nitro xylene and nitro ethyl benzene as the solvent. When reaction is carried out in such solvents at a temperature below about 40° C., a high yield of 1-naphthalenesulfonic acid containing less than 3% of the undesirable 2-naphthalenesulfonic acid is obtained.

Solvents suitable for use in the process of this invention are liquid, carbocyclic nitrohydrocarbons containing at least 6 carbon atoms. The solvents of primary choice include nitrobenzene and lower-alkyl nitrobenzenes such as o-, m- and p-nitrotoluene, and the like.

A feature of this invention is that the amount of solvent must be maintained within certain critical limits. In general, the solvent:naphthalene weight ratio should be from about 2:1 to about 10:1. This is quite surprising as in similar chemical reactions the ratio of solvent to reactants is of only minor significance.

In the present invention, it has been found that in reacting chlorosulfonic acid with naphthalene, if the solvent:naphthalene weight ratio is below about 1.8:1, the reaction mass is not only unworkable, but yields a product too high in 2-isomer content. About 2:1 is the pratcical minimum to obtain an adequate product.

When the solvent:naphthalene ratio goes above about 8:1, the 2-isomer content of the product is low but unfortunately the yield of the desired 1-isomer also falls precipitously. This decrease in 1-isomer yield starts to become noticeable when the solvent:naphthalene ratio exceeds about 4:1.

Accordingly, to obtain results suitable for commercial development, the solvent:naphthalene ratio must be maintained between about 2:1 to about 4:1 to give a high yield of a relatively pure product. However, for the preparation of 1-naphthalene sulfonic acid for certain special uses where very low contamination with the 2-isomer is controlling, i.e., more important than good yield, up to about 10:1 may be necessary. Usually a ratio of about 8:1 will be found preferable for this purpose.

Chlorosulfonic acid may be used as such in the reaction. However, it is sometimes convenient to prepare the chlorosulfonic acid in situ by reaction of sulfur trioxide and hydrogen chloride. This may have economic advantages for commercial operations and at the same time avoids some of the hazards and inconvenience of handling chlorosulfonic acid itself.

Chlorosulfonic acid may be used in amounts ranging from equimolar to about 1.5 times this quantity, based on the naphthalene feed rate. In preferred embodiments, the molar ratio of chlorosulfonic acid to naphthalene is from about 1:1 to about 1.1:1.

The useful temperature range falls between the narrow limits of about 5° to about 40° C. When the reaction is allowed to proceed at higher temperatures, the sulfonated product shows a substantial increase in degree of contamination by unwanted 2-isomer, by sulfonylchlorides, and even by disulfonic acids. At lower temperatures, the reaction mixture cannot be readily stirred and sulfonation does not proceed satisfactorily.

Procedurally, the process of this invention is preferably carried out by preparing a slurry of naphthalene in the solvent, then treating the resultant slurry with chlorosulfonic acid. The latter may be diluted with the selected solvent if so desired. Chlorosulfonic acid is gradually added to the solvent-naphthalene slurry. Since reaction is exothermic, feed rates must be sufficiently slow that the exothermic heat does not raise the temperature of the mass to above about 40° C. Otherwise expensive cooling equipment is required.

As the reaction takes place, naphthalenesulfonic acid precipitates. Good crystallization is assisted in most cases by initially seeding the mixture with a few crystals of 1-naphthalenesulfonic acid. After addition of chlorosulfonic acid is completed, the resultant mixture is stirred for a short period of time and the slurry is then filtered.

Filter cake so-collected, contains the actual yield of 1-naphthalenesulfonic acid. It is dried to remove as much of the solvent as practicable. In the solvents of this invention, the 2-isomer is preferentially soluble compared with the 1-isomer. Accordingly, the 2-isomer is concentrated in the filtrate. Improper separation of the solvent from the filter cake therefore increases the content of 2-isomer in the filter cake and care should be taken to avoid this. The 1-naphthalenesulfonic acid collected in the filter cake may be further dried and used as such for conversion to high-grade 1-naphthol, or it may be converted to its sodium salt by conventional methods for other known uses.

In the examples which follow, the process is further illustrated. Unless otherwise noted, all percentages and parts are by weight and temperatures are in degrees centigrade.

*Example 1*

A mixture of 116.5 parts chlorosulfonic acid in 120 parts nitrobenzene is added over a period of 30 minutes to a slurry of 128 parts naphthalene in 120 parts nitrobenzene, keeping the temperature at about 25° C. The batch is seeded with crystals of 1-naphthalene sulfonic acid to insure good crystallization during the reaction. After addition of chlorosulfonic acid is complete, the resultant slurry is stirred for about twenty minutes and then filtered, leaving the cake as dry as possible. Assay of the filter cake shows about 163.7 parts of naphthalenesulfonic acids (88% yield) of which only 1.57% is the 2-isomer.

*Example 2*

The procedure in Example 1 is repeated, varying the amount of chlorosulfonic acid used from equimolar quantities of acid and naphthalene. The results are summarized in the following table:

| Ratio of moles Naphthalene to moles Chlorosulfonic Acid | Percent Yield of Naphthalene-sulfonic Acids Isolated | Percent 2-Isomer in Acids of Filter Cake |
|---|---|---|
| 1:1.0 | 88.6 | 2.05 |
| 1:1.05 | 88.0 | 1.57 |

*Example 3*

Using the procedure described in Example 1, naphthalene slurried in nitrobenzene is reacted with a 10% excess of chlorosulfonic acid at temperatures from 20° to 30° C., varying the amount of nitrobenzene used. The results are summarized in the following table:

| Ratio of Parts Nitrobenzene to parts Naphthalene | Temp., °C. | Percent Yield of Naphthalene-sulfonic Acid Isolated | Percent of 2-Isomer in Acids Isolated from Filter Cake |
|---|---|---|---|
| 2:1 | 18–22 | 86.0 | 2.53 |
| 3:1 | 25–28 | 82.0 | 0.89 |
| 5:1 | 25–30 | 69.2 | 0.2 |
| 8:1 | 20–25 | 52.5 | none |

*Example 4*

A mixture of 143 parts of chlorosulfonic acid and 120 parts nitrobenzene is added to a slurry of 150 parts naphthalene (1.11 mole) in 180 parts of nitrobenzene, the rate of addition being such that the temperature is kept approximately at 20° C. After the addition is complete, the mixture is stirred for an additional 35 minutes at 20° C. and then is worked up to isolate the product using the procedure described in Example 1. An 86% yield of naphthalenesulfonic acids is isolated of which only 2.53% is the 2-isomer.

The same procedure is carried out except that the temperature is varied from 10° C. to 40° C. The results are summarized in the following table:

| Temp., °C. | Percent Yield of Naphthalene-sulfonic Acids Isolated | Percent of 2-Isomer in Acids Isolated From Filter Cake |
|---|---|---|
| 10 | 86 | 1.08 |
| 20 | 86 | 2.53 |
| 40 | 78 | 2.34 |

*Example 5*

A slurry of 64 parts naphthalene in 64 parts o-nitrotoluene is reacted with 58 parts chlorosulfonic acid in 64 parts o-nitrotoluene, keeping the temperature at 20° C. and following the procedure of Example 1. A 76.2% yield of naphthalenesulfonic acid is isolated of which 2.63% is the 2-naphthalenesulfonic acid.

We claim:
1. A process for the preparation of 1-naphthalene sulfonic acid containing less than three percent by weight of the 2-isomer which comprises reacting substantially equimolar amounts of chlorosulfonic acid and naphthalene at a temperature of 5° to 40° C., in a slurry of a nitrohydrocarbon selected from the group consisting of nitrobenzene and lower alkyl derivatives thereof, the weight ratio of nitrohydrocarbon to naphthalene being between 1.8:1 and 10:1, separating the precipitated 1-isomer from the reaction mixture and thereby recovering it substantially pure and free of the 2-isomer.

2. The process of claim 1 in which the nitrohydrocarbon reacting mixture is filtered and substantially pure 1-naphthalene sulfonic acid recovered from the filter cake.

3. The process of claim 1 wherein the nitrohydrocarbon is nitrobenzene.

4. The process of claim 3 wherein the nitrobenzene:naphthalene ratio is from about 2:1 to about 4:1.

References Cited in the file of this patent

UNITED STATES PATENTS

| | | |
|---|---|---|
| 1,962,137 | Cotton | June 12, 1934 |
| 1,992,481 | Hasler et al. | Feb. 26, 1935 |
| 2,025,197 | Cotton | Dec. 24, 1935 |
| 2,955,134 | Tedeschi | Oct. 4, 1960 |

OTHER REFERENCES

Othmer et al.: Ind. & Eng. Chem., vol. 35, March 1943, p. 326.

Suter: Chemistry of Sulfur, John Wiley & Sons, Inc., New York, 1944, p. 272.

Stubbs et al.: J. Chem. Soc. (London), 1948, pp. 1065, 1073.

Elsevier's Encyclopedia of Organic Chemistry, vol. 12B, 1955, pp. 4845, 4914, 5288, 5289.

Groggins: Unit Processes in Organic Synthesis, Fifth Edition, 1958, pp. 323, 324.